US009656320B2

(12) United States Patent
Keller et al.

(10) Patent No.: US 9,656,320 B2
(45) Date of Patent: May 23, 2017

(54) METHOD FOR SIMULTANEOUSLY PRODUCING FIRST AND SECOND PISTON PARTS

(75) Inventors: Klaus Keller, Lorch (DE); Rainer Scharp, Vaihingen (DE)

(73) Assignee: Mahle International GmbH (DE)

( * ) Notice: Subject to any disclaimer, the term of this patent is extended or adjusted under 35 U.S.C. 154(b) by 864 days.

(21) Appl. No.: 13/490,203

(22) Filed: Jun. 6, 2012

(65) Prior Publication Data

US 2013/0092024 A1  Apr. 18, 2013

(30) Foreign Application Priority Data

Jun. 7, 2011 (DE) .......................... 10 2011 077 088

(51) Int. Cl.
| | | |
|---|---|---|
| *B21K 1/18* | (2006.01) | |
| *B23P 15/10* | (2006.01) | |
| *B21J 13/02* | (2006.01) | |
| *F16J 1/00* | (2006.01) | |

(Continued)

(52) U.S. Cl.
CPC ................. *B21K 1/18* (2013.01); *B21J 5/022* (2013.01); *B21J 13/02* (2013.01); *B23P 15/10* (2013.01); *F16J 1/005* (2013.01); *F02F 3/00* (2013.01); *F02F 2200/04* (2013.01); *Y10T 29/49249* (2015.01)

(58) Field of Classification Search
CPC .. F02F 3/003; F02F 3/22; F02F 3/0023; F02F 3/00; F02F 2200/04; Y10T 29/49249; B21K 1/18; B21J 5/022; B21J 13/02; B23P 15/10; F16J 1/005; B29C 45/0017
See application file for complete search history.

(56) References Cited

U.S. PATENT DOCUMENTS

| | | | | |
|---|---|---|---|---|
| 4,128,370 A | * | 12/1978 | Massa ........................... | 425/128 |
| 5,698,243 A | * | 12/1997 | Wakabayashi ...... | B29C 45/0017 164/342 |
| 6,691,666 B1 | | 2/2004 | Berr et al. | |

(Continued)

FOREIGN PATENT DOCUMENTS

| | | |
|---|---|---|
| DE | 974022 C | 8/1960 |
| DE | 10154117 A1 | 5/2003 |

(Continued)

OTHER PUBLICATIONS

English abstract provided for JP-62028039.

(Continued)

*Primary Examiner* — Jacob Cigna
*Assistant Examiner* — Lee A Holly
(74) *Attorney, Agent, or Firm* — Fishman Stewart PLLC

(57) ABSTRACT

A method and apparatus for simultaneously producing a first piston part and a second piston part via a forging device may include an upper die, at least one intermediate die, and a lower die. A first billet may be placed between the upper die and the intermediate die, and a second billet may be placed between the intermediate die and the lower die. The upper die and the lower die may be configured to be moved toward each other, whereby the first piston part is forged from the first billet and the second piston part is forged at the same time from the second billet. The upper die and the lower die may then be configured to be moved apart, and the piston parts may be removed.

16 Claims, 1 Drawing Sheet

(51) Int. Cl.
*B21J 5/02* (2006.01)
*F02F 3/00* (2006.01)

(56) References Cited

U.S. PATENT DOCUMENTS

2003/0155685 A1* 8/2003 Spengler ................. B29C 43/36
                                                           264/250
2008/0127818 A1 6/2008 Dye
2010/0108017 A1* 5/2010 Bing ..................... B23K 13/02
                                                           123/193.6

FOREIGN PATENT DOCUMENTS

| EP | 2295165 A1 * | 3/2011 |
| EP | 2295165 A1 | 3/2011 |
| JP | 63-171237 A | 7/1988 |
| JP | 4-41035 | 2/1992 |
| JP | 62-28039 A | 8/1994 |

OTHER PUBLICATIONS

English abstract for JP-04041035.
International Search Report for PCT/EP2012/060367.
German Search report for DE-102011077088.7.
English abstract for JP63-171237.
English abstract for DE-10154117.

\* cited by examiner

METHOD FOR SIMULTANEOUSLY PRODUCING FIRST AND SECOND PISTON PARTS

CROSS-REFERENCE TO RELATED APPLICATIONS

This application claims priority to German patent application DE 10 2011 077 088.7, filed Jun. 7, 2011, which is hereby incorporated by reference in its entirety.

TECHNICAL FIELD

The present invention relates to a method for simultaneously producing a first and a second piston part. The invention further relates to a forging device for carrying out the method according to the invention, and to a piston produced according to said method.

BACKGROUND

From DE 974 022, a method is known for simultaneously producing two pot-type pistons which each consist of a skirt and a bottom and outer surfaces which are to be mechanically finish machined in successive steps, wherein the basis is a casting or a pressed part which contains the two pot-type pistons, including the machining allowances, arranged in the same axis and with the bottom parts arranged in the middle, and which is machined on both skirts at the same time and is separated into the two pot-type pistons, e.g., by parting off or by cutoff grinding. Separating is carried out here only after finish-machining.

From US 2008/0127818 A1, another method is known for producing pistons for internal combustion engines.

SUMMARY

The present invention is concerned with the problem of providing a method for simultaneously producing two piston parts by means of which known pistons, in particular assembled pistons, can be produced in a cost-effective and faster manner. The present invention is further concerned with the problem of providing a forging device by means of which pistons can be produced, which means forged in the present case, in a more cost-effective and faster manner.

This problem is solved according to the invention by the subject matters of the independent claims. Advantageous embodiments are subject matter of the dependent claims.

The present invention is based on the general idea to be able to produce a piston, which normally consists of a piston upper part and a piston lower part, in a simple and fast manner with regard to the manufacturing technology by forging and thus producing both piston parts at the same time. Thus, the two piston parts, preferably a piston upper part and an associated piston lower part are produced simultaneously in a single forging process, wherein a first billet, that is, for example, a semi-finished steel part, is placed between an upper die and an intermediate die of a corresponding forging device, whereas a second billet is placed between the intermediate die and an associated lower die. Subsequently, the upper die and the lower die are moved toward each other, whereby from the first billet, the first piston part, preferably a piston upper part is forged, and at the same time, from the second billet, the second piston part, preferably the associated piston lower part is forged. Subsequently, the upper and the lower dies are moved apart from each other and the two piston parts are removed. It is clear, of course, that the first and the second piston parts together can form one piston or that the two piston parts are designed identically, for example as two piston upper parts or two piston lower parts. Compared to previously used drop forging methods, the cycle time can be halved with the method according to the invention because due to the intermediate die according to the invention, two forged parts, that is, two piston parts can be forged simultaneously. For the forging process itself, the upper die as well as the lower die can be displaceable so that, for example, the intermediate die is fixed; however, it is of course also conceivable that only the upper or the lower die is displaceable, wherein simultaneously forging two piston parts is possible in a fast and simple manner with all illustrated variants.

In an advantageous refinement of the method according to the invention, the intermediate die is held in position during forging by means of a spring device. This ensures that during the fast and power-consuming forging process, the intermediate die is held in its predefined position, wherein the spring device is able, for example, to compensate small tolerances. Of course, it is also conceivable that the intermediate die itself is fixed into place so that the upper die can be moved from above and the lower die can be moved from below toward the intermediate die.

In another advantageous embodiment of the method according to the invention, not only one, but at least two intermediate dies are present so that during a single forging process not only two piston parts, but, for example, three or more piston parts can be produced at the same time. It is in particular conceivable here to simultaneously produce an upper piston part, a lower piston part, and an intermediate piston part with adequate cooling channel structures which are arranged between the piston upper part and the piston lower part.

In general, it is conceivable here that with the method according to the invention, many different types of pistons can be produced in a simple manner with regard to the manufacturing process and, at the same time, within a short cycle time, wherein the individual piston parts produced with the method according to the invention can of course be subjected to further machining steps such as, for example, turning. In a subsequent manufacturing step, the piston parts are joined together to form a piston, for example, are connected to each other through a friction welding connection.

Further important features and advantages of the invention arise from the sub-claims, from the drawings, and from the associated description of the figures based on the drawings.

It is to be understood that the above mentioned features and the features still to be explained hereinafter are not only usable in the respective mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

BRIEF DESCRIPTION OF THE DRAWINGS

In the figures, schematically.

DETAILED DESCRIPTION

Figure 1:
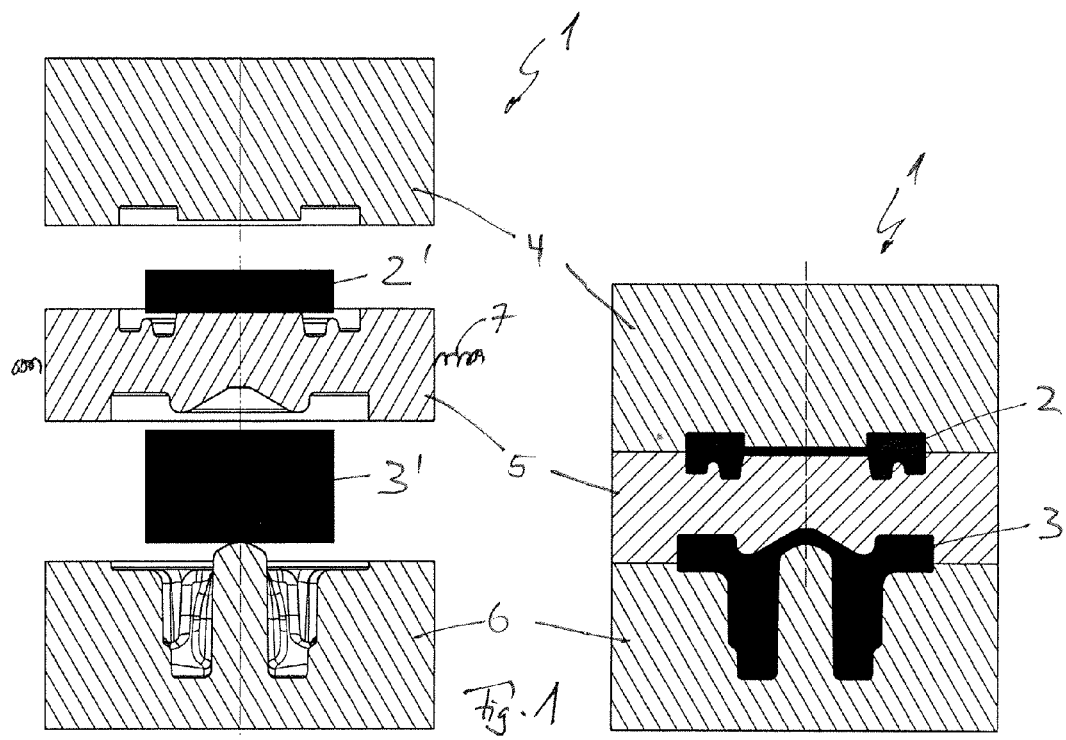
FIG. 1 shows a forging device according to the invention with an upper die, an intermediate die and a lower die, in the left illustration in the open position and in the right illustration in the closed position, for producing a piston upper part and a piston lower part.
Figure 2:
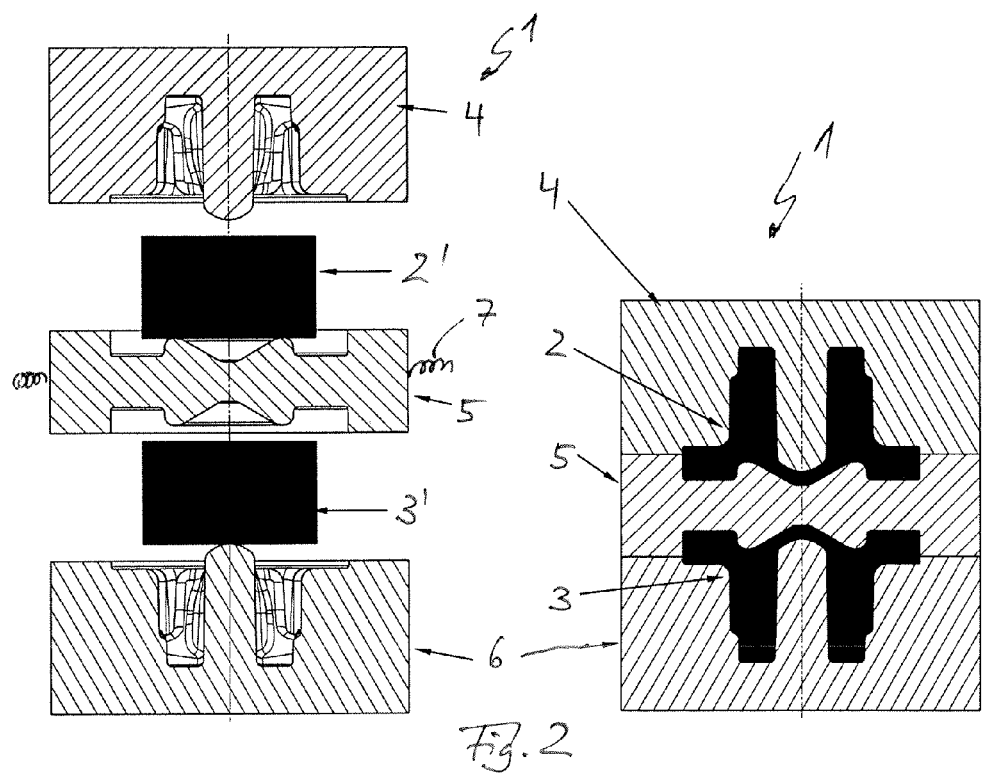
FIG. 2 shows an illustration as in FIG. 1, but with identical upper and lower dies for producing two identical piston lower parts.

According to the FIGS. 1 and 2, a forging device 1 according to the invention for simultaneously producing a first piston part 2, for example a piston upper part, and a second piston part 3, for example a piston lower part, comprises an upper die 4, an intermediate die 5 and a lower die 6. Here, only a single intermediate die 5 is provided, wherein it is conceivable, of course, that a plurality of intermediate dies 5 arranged between the respective upper die 4 and the associated lower die 6 can be provided. According to FIG. 1, the upper die 4 is designed differently than the lower die 5, whereas according to FIG. 2, the upper die 4 and the lower die 6 are designed identically and are simply arranged rotated by 180° relative to each other. For fixing the intermediate die 5 during the forging process, for example, a spring device 7 can be provided which, according to the FIGS. 1 and 2, is drawn with spiral springs which are illustrated only schematically. For forging the first and the second piston parts 2, 3, only the upper die 4 or the lower die 6 can be moved, or both dies 4, 6.

The two piston parts 2, 3 are produced according to a method according to the invention in which the forging device 1 according to the invention is used. When using said method, first, the upper die 4 and the lower die 6 are moved apart so that between them and the intermediate die 5 arranged therebetween, free spaces are created. Subsequently, a first billet 2', for example a semi-finished steel or aluminum piece is placed or inserted between the upper die 4 and the intermediate die 5, and a second billet 3' is placed between the intermediate die 5 and the lower die 6. Thereafter, the upper die 4 and the lower die 6 are moved toward each other, whereby from the first billet 2', the first piston part 2, thus, for example, the piston upper part is forged, and from the second billet 3', the second piston part 3, that is, for example, the piston lower part, is forged. Subsequently, the upper die 4 and the lower die 6 are moved apart and the piston parts 2, 3 can be removed.

With the forging device 1 according to the invention and in particular also with the method according to the invention, two separate piston parts 2, 3 can be forged in a single work step, wherein each of said parts can be pre- or finish formed on both sides. As can be seen from FIG. 1, the first and the second piston parts 2, 3 can have different configurations, or can be identical as illustrated, for example, according to FIG. 2. The method according to the invention can be designated as so-called "double forging using an intermediate die".

After removing the two pre- or finish formed piston parts 2, 3 from the forging device 1, further processing of said parts is of course still possible, that is, for example, said parts can be subjected to a further manufacturing step; in particular, they can be turned or ground. Subsequently, provided that a piston upper part and an associated piston lower part are involved, the two piston parts 2, 3 can be connected to each other, in particular welded together.

With the method according to the invention and the associated forging device 1 according to the invention, the production of piston parts 2, 3 and thus also of the piston itself can be significantly rationalized and therefore can be made significantly faster and, at the same time, more cost-effective.

The invention claimed is:

1. A method for simultaneously producing a first piston part and a second piston part via a forging device, comprising: an upper die, at least one intermediate die and a lower die, and
   placing a first billet between the upper die and the intermediate die, and placing a second billet between the intermediate die and the lower die,
   moving the upper die and the lower die in opposite directions toward each other, whereby the first piston part is forged from the first billet and the second piston part is forged at the same time from the second billet, and wherein the intermediate die is secured in a predefined position during the moving of the upper die and the lower die toward each other,
   moving the upper die and the lower die apart, and removing the piston parts,
   wherein the intermediate die is held in the predefined position at least until the step of removing the piston parts.

2. The method according to claim 1, wherein the first piston part is formed as at least one of a piston upper part and a piston lower part, and wherein the second piston part is formed as at least one of a piston upper part and a piston lower part.

3. The method according to claim 1, wherein the intermediate die is fixed in the predefined position on the forging device.

4. The method according to claim 3, wherein the forged piston parts are subsequently subjected to at least one of a turning, milling and grinding operation.

5. The method according to claim 1, wherein the intermediate die is held in the predefined position during forging by a spring device.

6. The method according to claim 1, wherein the forged piston parts are subsequently subjected to at least one of a turning, milling and grinding operation.

7. The method according to claim 1, wherein one of (i) the upper die is profiled differently than the lower die and (ii) the upper die is profiled the same as the lower die.

8. A method for simultaneously producing a first piston part and a second piston part, comprising the steps of:
   providing a forging device including a moveable upper die, a stationary intermediate die and a moveable lower die, wherein the intermediate die is fixed in a predefined position on the forging device between the upper die and the lower die;
   placing a first billet between the upper die and the intermediate die, and placing a second billet between the intermediate die and the lower die;
   moving the upper die towards the intermediate die in a first direction and moving the lower die towards the intermediate die in a second direction opposite the first direction, whereby the first piston part is forged from the first billet and the second piston part is forged from the second billet;
   moving the upper die and the lower die away from the intermediate die; and
   wherein the intermediate die is secured in the predefined position at least until the first piston part and the second piston part are removed.

9. The method according to claim 8, wherein the intermediate die is secured in the predefined position via a spring device.

10. The method according to claim 8, wherein moving the upper die towards the intermediate die is simultaneous with moving the lower die towards the intermediate die.

11. The method according to claim 8, wherein one of (i) the upper die is profiled differently than the lower die and (ii) the upper die is profiled the same as the lower die.

12. The method according to claim 11, wherein the first piston part is formed as one of a piston upper part and a piston lower part, and the second piston part is formed as one of a piston upper part and a piston lower part.

13. The method according to claim 8, further comprising the step of removing the first piston part and the second piston part.

14. The method according to claim 13, wherein the forged first piston part and the forged second piston part are subsequently subject to at least one of a turning, a milling and a grinding operation.

15. A method for simultaneously producing a first piston part and a second piston part via a forging device, comprising: a moveable upper die, a stationary intermediate die and a moveable lower die; and placing a first billet between the upper die and the intermediate die, and placing a second billet between the intermediate die and the lower die;

moving the upper die towards the intermediate die and simultaneously moving the lower die towards the intermediate die, whereby the first piston part is forged from the first billet and the second piston part is forged at the same time from the second billet, and wherein the intermediate die is secured in a predefined position during the moving of the upper die and the lower die;

moving the upper die and the lower die away from the intermediate die; and removing the piston parts;

wherein the intermediate die is secured in the predefined position at least until the piston parts are removed; and wherein the intermediate die is secured in the predefined position via a spring device to compensate for tolerances.

16. The method according to claim 8, wherein only one of the upper die and the lower die is moved at a time.

* * * * *